United States Patent [19]

Viesselmann

[11] Patent Number: 4,595,318

[45] Date of Patent: Jun. 17, 1986

[54] FORAGE BLOWER HAVING REPLACEABLE WEAR LINER

[75] Inventor: Kim P. Viesselmann, Grafton, Wis.

[73] Assignee: GEHL Company, West Bend, Wis.

[21] Appl. No.: 627,787

[22] Filed: Jul. 5, 1984

[51] Int. Cl.⁴ .............................................. B65G 53/58
[52] U.S. Cl. ....................................... 406/97; 406/71;
406/193; 415/127; 415/128; 415/196
[58] Field of Search ........................ 406/57, 71, 80, 96,
406/97, 193, 99–103; 415/126–128, 196

[56] References Cited

U.S. PATENT DOCUMENTS

| | | | |
|---|---|---|---|
| 1,211,784 | 1/1917 | Stuart | 406/193 |
| 1,806,494 | 5/1931 | O'Brien | 406/97 |
| 3,110,521 | 11/1963 | Rogers et al. | 406/193 |
| 3,175,867 | 3/1965 | Fenster et al. | 406/100 |
| 3,466,095 | 9/1969 | Weihmuller | 406/100 |
| 3,867,064 | 2/1975 | Sorensen et al. | 406/96 X |

Primary Examiner—Jeffrey V. Nase
Attorney, Agent, or Firm—James E. Nilles

[57] ABSTRACT

A forage blower having an upwardly extending, tangential blower outlet transition member which is hinged along one of its sides so as to be moved to thereby expose the inside of the blower housing. The blower housing includes a two-portion rim sheet. A wear liner is secured in one portion of the rim sheet and is located generally in the lower part of the blower housing; this wear liner can be replaced by circumferentially shifting the rim sheet and the wear liner together to an area where the wear liner can be replaced when the blower outlet transition member is moved. The construction of the side walls, rim sheet portion and liner is such that a smooth and unobstructed inner surface of the liner and rim sheet is provided for the material being handled.

2 Claims, 10 Drawing Figures

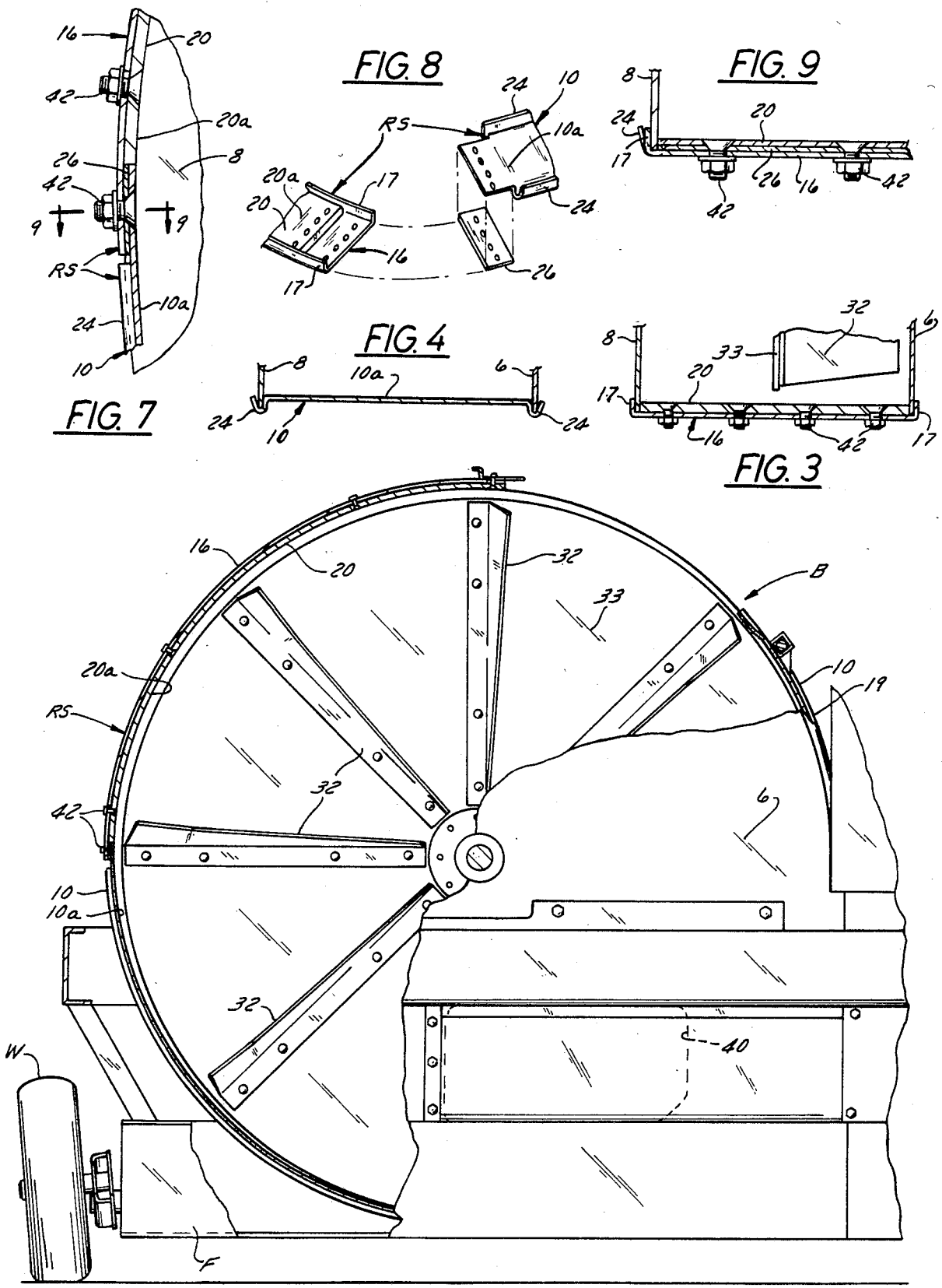

FORAGE BLOWER HAVING REPLACEABLE WEAR LINER

BACKGROUND OF THE INVENTION

This invention relates generally to forage blowers of the type that receive chopped forage from a wagon or other vehicle of the like and convey it upwardly to the top of a silo.

An example of the type of blower to which the present invention pertains generally is shown in the U.S. Pat. No. 3,724,908, issued Apr. 3, 1973, to Burrough et al. and which patent has been assigned to an assignee common with the present invention.

One problem with blowers of this type is due to wear in the blower because of the volume and abrasive nature of the material being conveyed. The material is also often cohesive or gummy and tends to build up in certain areas of the blower. As a result, it is difficult, time consuming and costly to replace or repair or clean the parts that have become worn, damaged, or gummed up. Replaceable wear liners have been proposed generally in various types of equipment but in the case of a blower as proposed by the present invention, a wear liner must be located in an area that is inaccessible and prior art devices have required the dismantling of the blower in order to accomplish the replacement, for example, of the rim sheet of the blower. Furthermore, such liners must not offer any obstruction to the smooth flow of material.

SUMMARY OF THE INVENTION

The present invention provides a forage blower having a generally vertically positioned blower housing of generally circular shape when viewed in elevation and which has an outlet opening adjacent its upper portion. The blower also has a generally tangential blower outlet transition member extending upwardly from and in communication with the outlet opening. The housing comprises a pair of generally circular and laterally spaced apart side sheets, an annular peripheral rim sheet slidably mounted around the periphery of said side sheets and also having means for being rigidly clamped against the side sheets when the blower is in an operative position. The arrangement is such that the rim sheet can be releaseable so as to be peripherally shiftable around said side sheets when said blower is inoperative. A forage inlet opening in at least one of the side sheet walls is utilized for introducing forage into the blower. The invention provides a replaceable rim sheet wear liner having fastening means for removably and rigidly securing the liner to the inside of said rim sheet. The liner extends generally from the forage inlet opening to the blower outlet opening.

The construction and assembly of the rim sheet, the side walls and wear liner provides a smooth and unobstructed, precisely aligned, continuous inner surface of the wear liner and rim sheet for uninterrupted flow of the material being conveyed.

These and other objects and advantages of the present invention will appear hereinafter as this disclosure progresses, reference being had to the accompanying drawings in which:

BRIEF DESCRIPTION OF THE DRAWINGS

FIG. 3 is a cross-sectional view, on an enlarged scale, taken along the line 3—3 in FIG. 2; and showing the wear liner in one portion of the rim sheet;

FIG. 4 is a cross-sectional view taken along line 4—4 in FIG. 2 and showing grooved portion of the rim sheet;

FIG. 6 is a view generally similar to FIG. 2 but showing the rim sheet and wear liner when it has been rotated upwardly to the area where the rim sheet can be unfastened from the wear plate and the latter removed;

FIG. 7 is a fragmentary enlarged view of the means for fastening the wear liner to one portion of the rim sheet and showing the transition area from the grooved portion of the rim sheet to the liner portion of the rim sheet;

FIG. 8 is a fragmentary, perspective, exploded view of the joint or connection between the wear liner portion and the other portion of the rim sheet;

FIG. 9 is a fragmentary cross-sectional view taken generally along line 9—9 in FIG. 7, and showing the shim between the rim sheet portions.

DESCRIPTION OF THE INVENTION

The forage blower B provided by the present invention is similar in its general arrangement to that shown in the U.S. Pat. No. 3,724,908 and reference may be had to that patent for certain details which are not believed to be necessary nor desirable to be described in the present disclosure.

Figure 1:
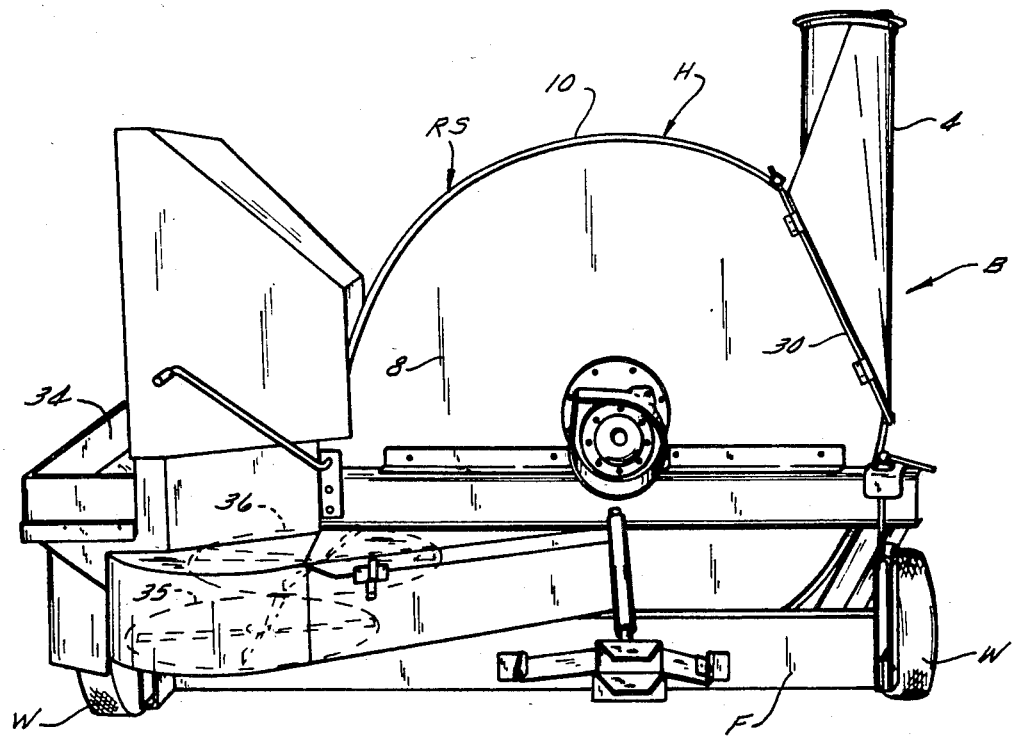
FIG. 1 is a perspective view taken generally from the front side of a forage blower made in accordance with the present invention.

The blower B includes a generally vertically positioned blower housing H of generally circular shape when viewed in elevation, and (FIGS. 1, 2, and 6) has an outlet opening 2 (FIG. 2) located adjacent its upper portion. An outlet transition member 4 extends upwardly from and is in communication with outlet opening 2.

The housing also has a pair of generally circular and laterally spaced apart side sheets 6 and 8, and a circumferential wall or annular peripheral rim sheet RS which can be slidably mounted around the periphery of the side sheets 6 and 8 when the rim sheet RS is loosened.

The rim sheet RS is formed in at least two portions 10 and 16 which are secured together as shown in FIG. 8 by bolt means that extend through aligned apertures in the adjacent ends of the rim sheet RS.

Rim sheet portion 10 extends around the major portion of the circumference of the blower, for example, from about area 18 (FIG. 2) to its end 19 (FIG. 2) adjacent the outlet opening 2. Rim sheet portion 16, which contains a wear liner 20, extends from area 18 to its end 21 adjacent the opposite side of outlet opening 2. The rim sheet portion 10 includes a groove 24 (FIG. 4) formed along each of its edges, and the sidewalls 6 and 8 are nested in these grooves (FIG. 4) for slidable engagement therein when the rim sheet RS is loosened, as will appear.

FIG. 3 shows a section through the wear liner 20 and rim sheet portion 16 and its side flanges 17; and how the rim sheet RS can slide around the edges of the side sheets 6 and 8.

FIG. 7 shows the smooth transition in the flow path of the material from the inner surface 10a of the rim sheet portion 10 to the inner surface 20a of the liner 20.

FIG. 8 shows the joint or connection between the wear liner 20 and the rim sheet portion 10, and a filler block or shim 26 may be secured adjacent the end of the wear liner 20 and on the outside of the end of the rim sheet portion 10, thereby making a flush continuous surface between the liner surface 20a of the wear liner 20 and the inner surface 10a of the rim sheet portion 10; at least the surfaces 20a and 10a are in general alignment. In any case, the first surface over which the material flows, i.e., the surface 10a of the rim sheet portion 10, is at least not further radially outward than the inner surface 20a of the liner 20.

It will be noted from FIGS. 3, 4, 7, and 9 that the depth of the grooves 24 in rim sheet portion 10 are such that, as compared with the thickness of the wear plate 20, the inner surface 10a of the rim sheet portion 10 is flush with the inner surface 20a of the wear liner 20 when the rim sheet RS is assembled. In other words, the inner surfaces match with one another, at least the surface 20a does not protrude above the surface 10a in respect to the flow of material thereover, as mentioned.

The opposed adjacent ends of the rim sheet RS are located one on each side of the blower opening 2 and together with the side sheets 6 and 8 define the outlet of the blower housing. These rim sheet ends are adjustably secured together by means of a large U-bolt threaded member 30 which is secured between the ends. When the rim sheet RS is loosened, it can be peripherally slid around the side walls 6 and 8 and when the nuts are tightened, the rim sheet RS is rigidly fixed around the side walls 6 and 8.

Figure 10:
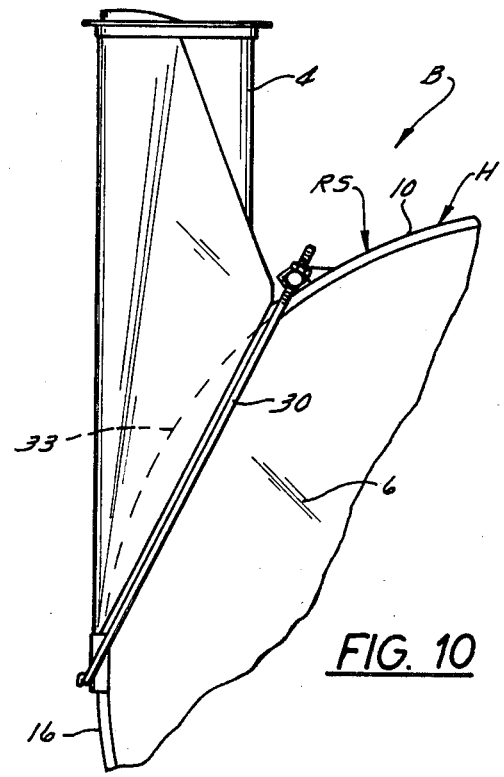
FIG. 10 is a fragmentary side elevational view of a portion of the blower as shown in FIG. 2, on an enlarged scale, and showing the large U-bolt means for tensioning the rim sheet.
Figures 2, 5:
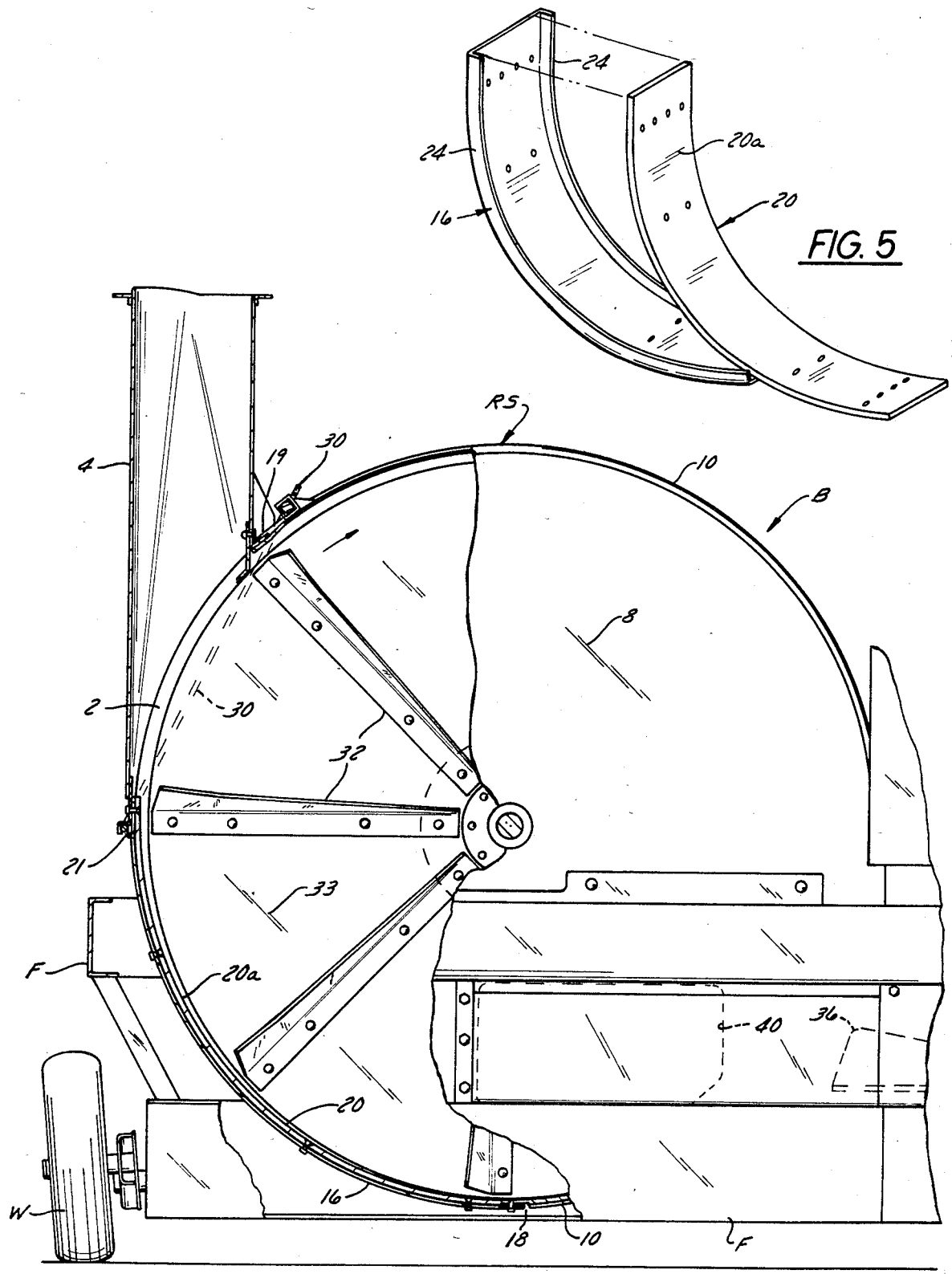
FIG. 2 is an elevational view partially in section, taken from the back side of the blower certain parts being broken away or removed for the sake of clarity.
FIG. 5 is a perspective and exploded view of a portion of the rim sheet and the wear liner which is attached thereto.

As shown in FIGS. 2 and 10, the U-bolt member 30 is inclined at an angle of about twenty-five to thirty degrees from the tangent to the discharge end of the rim sheet, i.e., generally from a vertical line. The positioning of the pivot axis of the blower outlet transition member 4 thereby permits the latter to be swung laterally on its hinges (FIG. 1) to one side of the blower housing H to expose the blower outlet opening 2.

The fan paddles 32 and the fan itself are conventional and include the large central wheel or disc member 33, commonly referred to as the fan. If a more complete description of this fan is deemed to be necessary or desirable, reference may be had to the said U.S. Pat. No. 3,724,908. Referring generally to the frame of the blower, the main frame F is shown as being mounted on ground wheels W in the conventional manner and as described in said U.S. Pat. No. 3,724,908. The forage material is dumped from a vehicle such as a wagon into the hopper 34 (FIG. 1) and is fed by the pair of horizontally disposed rotatable paddles 35 and 36 into the side walls 6 and 8 of the blower. One of the forage inlet openings 40 into the blower is shown in FIG. 2 by the dotted lines. Thus, the material enters the blower through the opening 40 and is conveyed circumferentially approximately in a quadrant of about ninety degrees within the housing to the discharge outlet transition member. It is this quadrant area of the blower rim sheet that is particularly susceptible to wear and abuse due to the volume and nature of the material moving over it, and this area or location is difficult to service.

As shown clearly in FIG. 5, the rim sheet wear liner 20 is provided along the rim sheet portion 16 in the quadrant area generally from the inlet 40 to the outlet transition member 4 within the blower housing. The relatively thick steel wear plate or liner 20 is secured to the rim sheet portion 16 by bolt means 42 that extend through aligned holes in the rim sheet and wear liner. The replaceable rim sheet liner 20 is generally located in the inaccessible area, and this wear liner 20 fits complimentary with the beaded and rolled rim sheet portion 10.

When it is desired to repair or replace the wear liner 20, the blower outlet transition member 4 and the large U-bolt member 30 may be removed. The tension in the assembled rim sheet RS is thus released, thereby permitting the rim sheet RS to be peripherally slid around on the edges of the side walls 6 and 8 to thereby present that fastener 42 which holds the rim sheet to the wear liner, for easy removal. The operator can then remove the fastener 42 and consequently remove the wear liner 20 from the rim sheet portion 16. Alternatively, the rim sheet portion 16 and wear liner 20 can be removed together for liner replacement.

I claim:

1. A forage blower comprising:

a main frame;

a blower housing mounted on said main frame, said blower housing being generally cylindrical in shape, and having vertically disposed circular sides, a peripheral edge, and having an outlet opening through and near the top of its peripheral edge and an inlet opening through one of its sides;

a rotatable fan mounted within said blower housing; and a blower outlet transition member movably mounted on said housing, said member being movable between one position wherein it is in communication with said outlet opening and extends upwardly and tangentially from said blower housing and another position wherein it is positioned along one of said sides of said blower housing;

said blower housing comprising:

a pair of circular laterally spaced apart stationary side sheets defining said circular sides;

an annular peripheral rim sheet mounted on and around the peripheral edges of said side sheets, said rim sheet having spaced apart ends defining said outlet opening in said housing;

a replaceable rim sheet wear liner disposed on the inside of said blower housing adjacent said rim sheet and accessible for replacement through said outlet opening;

releasable fasteners mounted on the exterior of said rim sheet and extending therethrough for releasably attaching said liner in a fixed position on said rim sheet;

adjustable clamping means connected between said spaced apart ends of said rim sheet and having one condition wherein said clamping means clamp said rim sheet in fixed position relative to said side sheets and having another condition wherein said rim sheet is slidably secured to said side sheets and circumferentially shiftable relative to said side sheets between one position wherein said outlet opening is in an operative position and at least some of said fasteners are positioned on the bottom of said blower housing and inaccessible for release, and another position wherein said some fasteners are positioned at a circumferential side of said blower housing and accessible for release to enable removal or installation of said liner; and hinge means on said transition member and on said adjustable clamping means for pivotably connecting said transistion member to said adjustable clamping means, said hinge means defining a pivot axis disposed along a side of said blower housing, which axis is in a near vertical position when said rim sheet, is in its said fixed position, to enable said transition member to be pivoted between its said positions.

2. A forage blower according to claim 1 wherein said adjustable clamping means comprises at least one rod disposed along said pivot axis;

and wherein said hinge means comprises a portion of said rod and a hinge member on said transition member which is connected to said rod to enable said transition member to be swung about said pivot axis.

* * * * *